Feb. 17, 1970  A. J. SBARE  3,495,352
LAWN EDGING STRUCTURE
Filed Dec. 22, 1967  3 Sheets-Sheet 1
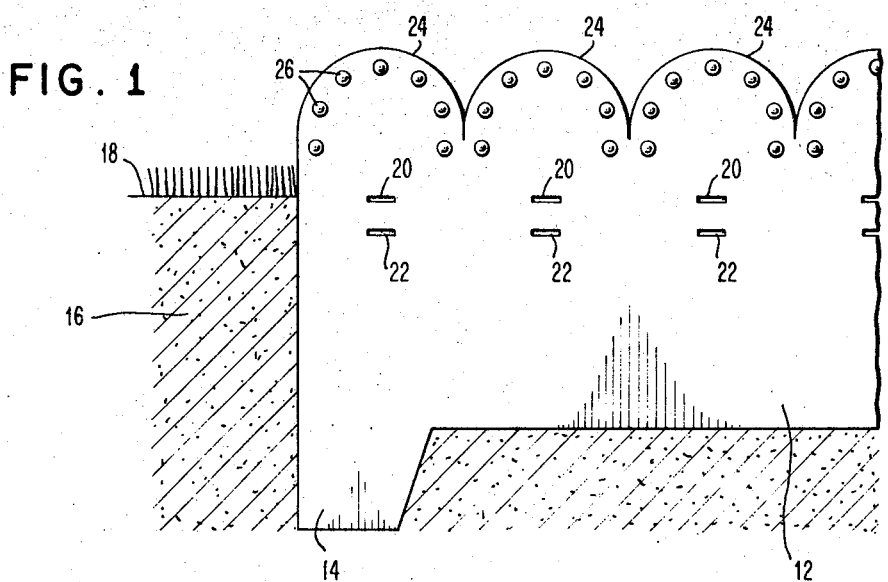
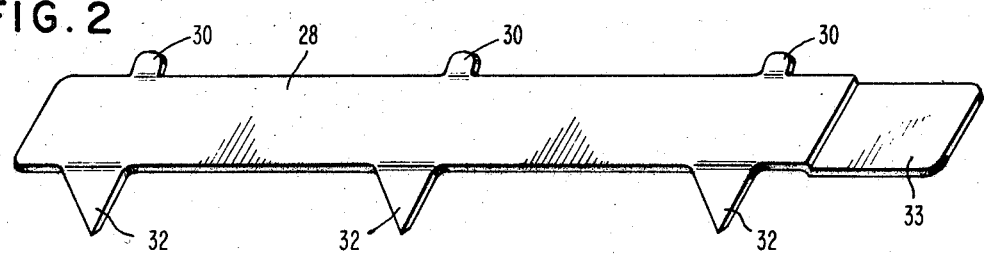
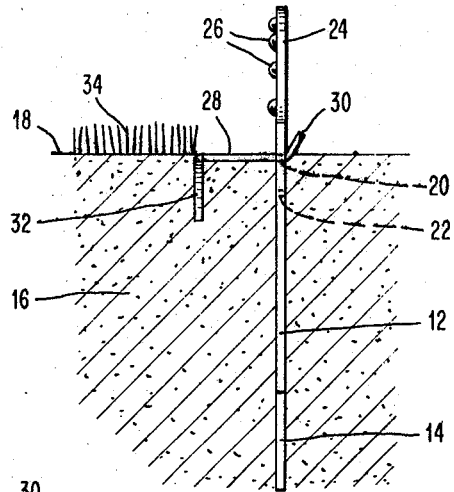
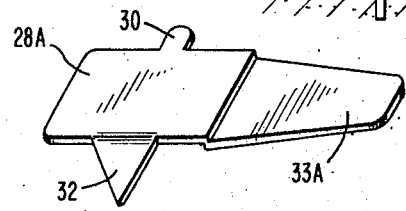
INVENTOR
ARMAND J. SBARE
BY
ATTORNEY

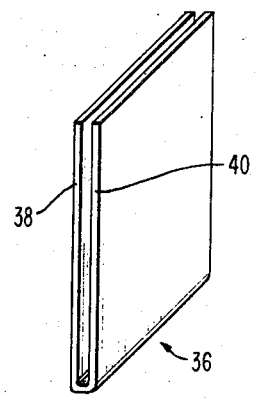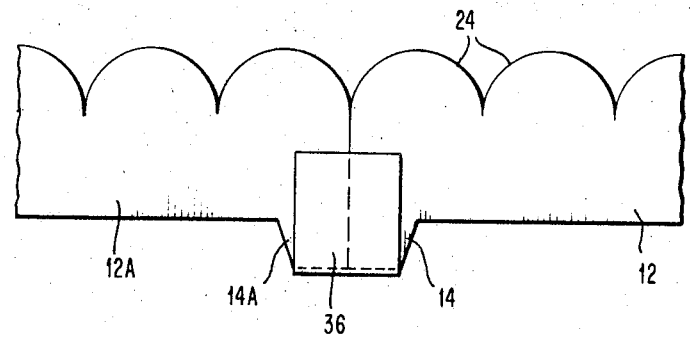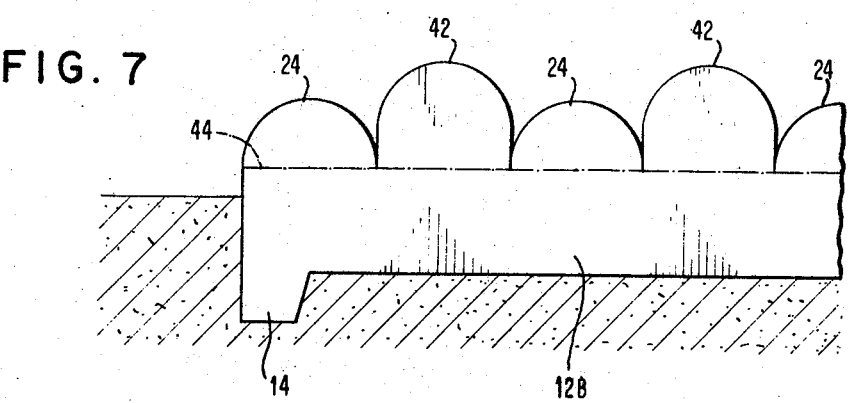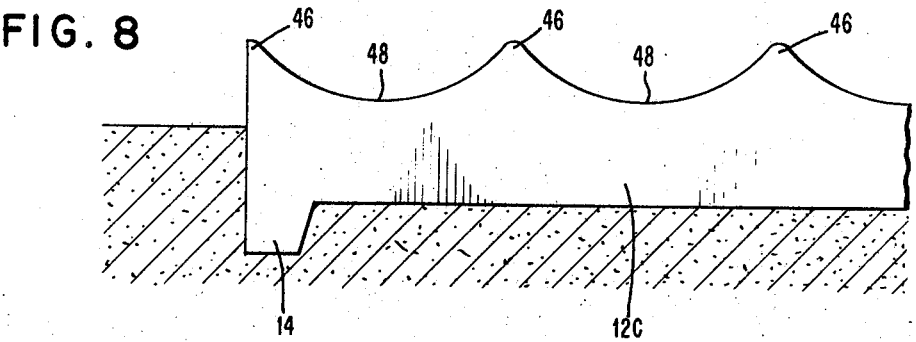

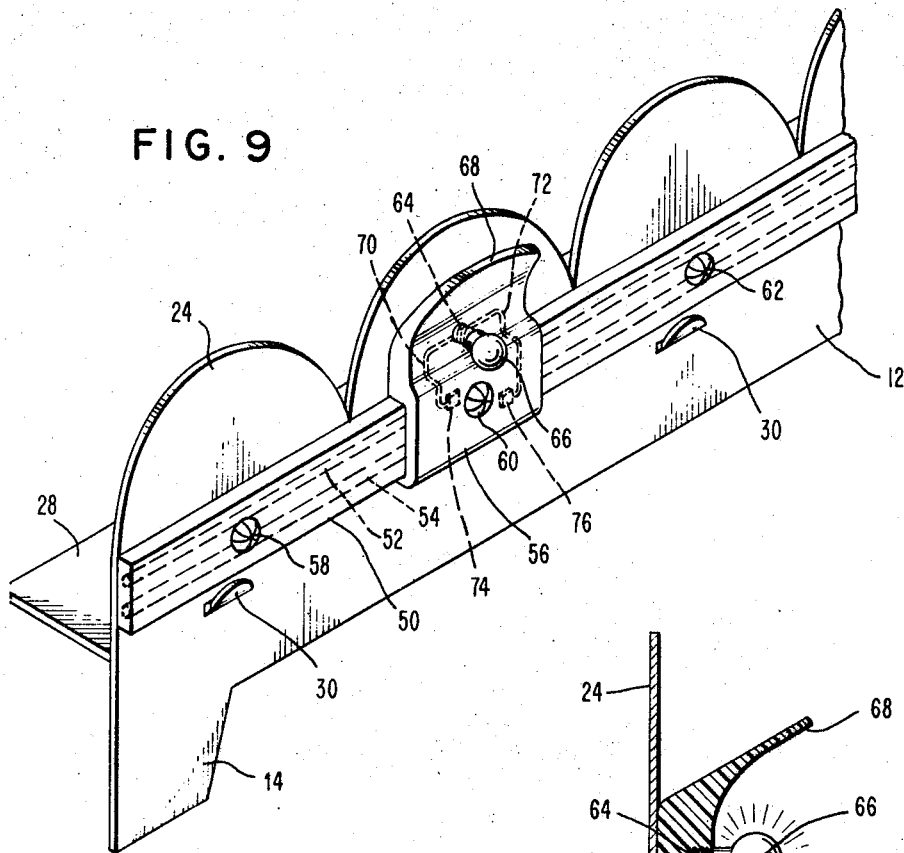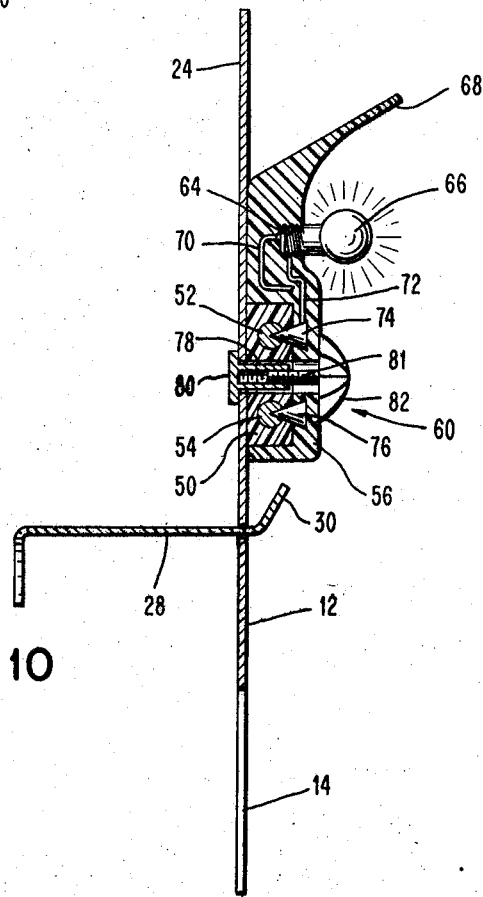

United States Patent Office 3,495,352
Patented Feb. 17, 1970

3,495,352
LAWN EDGING STRUCTURE
Armand J. Sbare, 46 Earley St.,
City Island, N.Y. 10464
Filed Dec. 22, 1967, Ser. No. 693,006
Int. Cl. F21v 33/00; A01g 1/08
U.S. Cl. 47—33     4 Claims

ABSTRACT OF THE DISCLOSURE

An improved lawn edging structure having a main body plate to be embedded in the ground between the lawn edge and an area from which grass is to be excluded, including an auxiliary plate arranged for attachment to the main plate at grade level and extending horizontally into the lawn area to block grass growth adjacent to the main body plate, while permitting lawn mower operation over the auxiliary plate.

---

This invention relates to an improved lawn edging structure, and particularly to such a structure including means for excluding grass from a strip adjacent to the lawn edging structure.

In the maintenance of lawns and gardens, it is a constant problem that the grass from the lawn tends to grow into garden beds. Thus, the maintenance of proper edges of the lawn at the garden beds requires considerable attention. In order to cut down the labor involved in this maintenance problem, strips of sheet metal have been employed, the metal being embedded in a vertical position between the lawn and the garden bed to exclude grass from entry into the garden bed. Although these structures have been found to be reasonably effective, they also have some important shortcomings. For instance, if the metal edging is embedded into the ground far enough to permit a lawn mower to pass over the top of the metal edging to cut the grass efficiently at the edge, then the edging is low enough so that the grass can actually seed itself across the edging and somehow grow into the garden bed. However, if the edging is not embedded so deep as to permit the lawn mower to travel across the top of it, then the lawn mower must be operated up to the edging, with the edging acting as a barrier. Since most lawn mowers are not capable of trimming all of the grass up to a barrier of this kind, the presence of the metal edging requires that there must be considerable hand trimming of the grass at the edging barrier.

Accordingly, it is an object of the present invention to provide an improved lawn edging structure which is not only completely effective to exclude grass from an adjacent area, but in which the grass is blocked out from a strip immediately adjacent to the main body of the lawn edging structure so that no hand trimming is required at the edging.

Other objects and advantages of the invention will be apparent from the following description and the accompanying drawings.

In carrying out the invention there is provided an improved lawn edging structure including a main body plate adapted to be embedded in the ground in a substantially vertical position between the lawn edge and an area from which grass is to be excluded. An auxiliary plate is arranged for attachment to the main plate at grade level and extending horizontally into the lawn area to block grass growth in a strip adjacent to the main body plate.

In the accompanying drawings:

FIG. 1 is a front view of a main body plate of a preferred embodiment of the invention.

FIG. 2 is a perspective view of an auxiliary plate arranged for attachment to the main plate of FIG. 1.

FIG. 3 is an assembled end view showing the main body plate and the auxiliary plate assembled and installed in the ground.

FIG. 4 illustrates a modification of the auxiliary plate of FIG. 2.

FIG. 5 is a perspective view of a coupling to be employed in attaching the ends of two adjacent main plates.

FIG. 6 is a front view showing the coupling of FIG. 5 installed.

FIG. 7 is a front view corresponding to the front view of FIG. 1 and illustrating an alternative configuration for the main plate.

FIG. 8 is a front view corresponding to the front view of FIG. 1 and illustrating an alternative configuration for the main plate.

FIG. 9 illustrates an alternative form of the invention including an electrical conductor and an electrical lamp for illumination of the garden bed adjacent to the lawn edge.

And FIG. 10 is a cross sectional side view through the lamp connector assembly and the entire lawn edging structure as shown in FIG. 9.

Referring more particularly to FIG. 1, there is shown a main body plate 12 including a tang portion 14 at the bottom edge thereof which extends deeper into the ground than the rest of the main body plate. The body plate is shown in FIG. 1 as embedded in the ground indicated at 16 so that grade level is at 18. The ground 16 is sectioned away to expose a full front view of the main body plate 12.

The main plate 12 includes a series of horizontally spaced slotted perforations 20 arranged at, or just above the grade level 18. A second series of slotted perforations 22 may also be provided to perform the same function as slots 20, at grade level, in case the grade level dips to the lower level of 22. The slots 20 and 22 are provided for the purpose of attachment of the auxiliary plate to be described more fully below in connection with FIGS. 2 and 3.

The upper edge of the main plate 12 may be given various configurations. A preferred configuration is illustrated in FIG. 1 as forming a series of scallops 24. As a safety measure, and for decorative purposes, each of the scallops 24 may be provided with a series of small reflective "buttons" 26. These reflective buttons serve as a safety measure because they increase the visibility of the garden edge at night to thereby reduce pedestrian accidents. Furthermore, the reflectors 26 may be provided in various colors and color combinations to thereby serve a decorative function which complement the appearance of the plants in the garden bed.

FIG. 2 illustrates the auxiliary plate portion of a preferred form of the invention including an auxiliary plate body 28. Extending from the rear edge of the auxiliary plate body 28 there are provided spaced tabs 30. These tabs 30 extend outwardly and upwardly from the rear edge of the auxiliary plate 28. The tabs 30 are longitudinally spaced apart at dimensions which match the horizontal spacings of the slotted openings 20 in the main body 12 of FIG. 1. Thus, the tabs 30 may be inserted into the slotted openings 20 to provide for an attachment of the auxiliary body 28 to the main body 12. The horizontal spacing between adjacent tabs 30 may be approximately twice the spacing between adjacent slotted openings 20 in the main body 12. Thus, more slotted openings are provided than are used. This provides for greater flexibility in the arrangement of the auxiliary body member 28.

As further shown in FIG. 2, the auxiliary body member 28 is provided at its front edge with downwardly extending spurs 32. These spurs are arranged for the purpose of extending into an embedded position in the ground to essentially fasten the edge of the auxiliary body member into the ground and to stabilize that member in its desired position. Plate 28 is provided with a downwardly offset tongue portion 33 at one end thereof which is arranged to overlap with a next adjacent auxiliary plate. The overlapping tongue 33 serves to stabilize the ends of the auxiliary plates, the upper plate holding down the tongue 33 of the adjacent plate.

FIG. 3 is an end view of the lawn edging structure of the present invention with the auxiliary body 28 assembled to the main body 12, and with the assembled structure installed in the ground at the edge of the lawn. The ground is sectioned away in this view to reveal the exact positions of the various portions of the lawn edging structure. As shown in FIG. 3, the lawn area is shown on the left, and the area from which the lawn is to be excluded, such as a garden bed, is illustrated on the right. The grass of the lawn is shown at 34. FIG. 3 illustrates how the auxiliary body 28 blocks out the grass 34 in a strip adjacent to the main body member 12 corresponding to the width of the auxiliary member 28. A typical width dimension for the auxiliary body member 28 is one and one-half inches. The blocked strip provided by the auxiliary body member 28 permits the operation of a lawn mower in which the lawn mower wheel is allowed to ride upon the top surface of the auxiliary strip 28 and thus it is enabled to cut all of the grass 34 up to the auxiliary strip 28 without requiring any edge portion of the grass which must be hand trimmed.

FIG. 4 illustrates a modification of the auxiliary plate 28 of FIG. 2 including a body portion 28A having a single connector tab 30 and a single spur 32.

In FIG. 4, the tongue 33A corresponding to the tongue 33 of FIG. 2 preferably has its edges trimmed as illustrated at 36 and 38 to accommodate for bending of the main body plate to accommodate for curved lawn edges. It is apparent that whenever curved lawn edges are encountered, the main body plate must be curved to conform to those edges. In such instances, the auxiliary plate must be essentially articulated to accommodate for the main body plate curvature. This is accomplished by providing short auxiliary plate sections such as illustrated in FIG. 4. It will be understood that auxiliary plate sections of various lengths may be provided in addition to the two lengths illustrated in FIGS. 2 and 4.

FIG. 5 illustrates a coupling device 36 for coupling together two lawn edging structure main body plates as shown in FIG. 6. The coupling 36 is a U-shaped structure having two legs 38 and 40 joined together at the bottom and defining a throat between the two legs 38 and 40 which is dimensioned to accommodate for a single thickness of the main body plate.

FIG. 6 illustrates the assembly of the coupling member 36 upon the adjoining ends of two main body plates 12 and 12A. The coupling member 36 is simply slipped over the bottom edges of the two adjacent end tangs 14 and 14A of the main body plates 12 and 12A. The coupling 36 is preferably composed of a stiff spring material which serves to maintain the engagement upon the two main body plates to maintain the assembled relationship. When the edging structure is embedded into the ground, the coupling 36 is necessarily maintained in assembled relationship over the tangs 14 and 14A as long as the main body plates 12 and 12A remain embedded in the ground. The ground itself maintains the coupling 36 in the assembled relationship shown in FIG. 6.

The upper edge of the main body plate may be finished in a number of different decorative designs. FIGS. 7 and 8 illustrate only two of the many possible variations.

FIG. 7 illustrates an alternative design for the lawn edging structure in accordance with the present invention having a different decorative appearance at the upper edge portion in which the scalloped edges are alternatively low scallops 24 and high scallops 42. It will be understood, of course, that the upper edge of the main body plate may also be finished off as a simple straight edge as by cutting off all of the scallops 24 and 42 illustrated in FIG. 7 at the dotted line 44. It will be understood that the dotted line 44 does not actually exist upon the actual structure of FIG. 7. It is illustrated here only for the purpose of teaching still another upper edge design.

FIG. 8 illustrates still another form of the invention in which the upper edge of the main body plate is finished with still another decorative design. In this design the upper edge is provided with a series of peaks 46 and valleys 48 which resemble the profile of a multiple tower suspension bridge.

FIG. 9 illustrates a modification of the invention in which there is provided a double electrical conductor structure 50 having two individual conductive elements 52 and 54 embedded therein. A lamp assembly 56 is provided which may be connected to the conductor elements 52 and 54 and mounted upon the side of the main body plate of the lawn edging structure to provide illumination to the garden bed when viewed from the lawn.

The entire lawn edging structure of FIG. 9 may be substantially identical to that illustrated and described in connection with FIGS. 1, 2, 3 and 4 above. The only exception is that the conductor structure 50 and the lamp assembly 56 have been added. In order to mount and position these additional components upon the main plate, the main plate is provided with spaced through holes for threaded fastenings, the ends of which are indicated at 58, 60 and 62 in FIG. 9. The double electrical conductor 50 and the lamp assembly 56 are also provided with corresponding through holes to accommodate the threaded fastenings 58, 60 and 62. The threaded fastenings are described more fully below in connection with the sectional end view of FIG. 10.

The double conductor 50 consists primarily of insulating material which surrounds and supports the individual conductive elements 52 and 54. While not clearly shown in FIG. 9, the conductive elements 52 and 54 are completely surrounded and embedded within the insulating body portion of the double conductor. Furthermore, the ends of the conductive elements 52 and 54 are preferably sealed within the insulation. The double conductor 50 is preferably of the same length as the associated main body plate of the lawn edging structure, the conductors of adjacent main body plates are electrically interconnected by a structure to be described below.

The lamp assembly 56 includes a conventional lamp socket portion 64 to accommodate a conventional low voltage electric lamp 66. The illumination from lamp 66 is prevented from being directed straight upwardly by a molded shade portion 68 of the lamp assembly. Within the molded body of the lamp assembly 56 there are conductors 70 and 72 leading from the lamp socket 64 and terminating with pointed conductive elements which protrude through the outer insulating surface of the conductive structure 50 and into the individual conductive elements 52 and 54. These pointed conductive elements are illustrated at 74 and 76 in FIG. 10.

FIG. 10 is a sectional side view, somewhat enlarged, of the lawn edging structure of FIG. 9, and particularly illustrating the construction of the interior of the lamp assembly 56 and its mode of connection to the double conductor 50. The main body portion of the lamp assembly 56 consists of a housing which has an essentially U shape as viewed from the double conductor 50, since it surrounds and embraces the double conductor 50. As explained above in connection with FIG. 9, pointed conductive elements 74 and 76 are provided as a part of the lamp assembly which pierce the outer insulating layer and penetrate into the individual conductors 52 and 54 to establish electrical connections therewith. Because of this simple mode of connection, any one of the threaded fastenings 58, 60 or 62 at any point along the main body plate may be unfastened, and one of the lamp assemblies may be attached by means of that fastening at a desired point where illumination is required. By simply retightening the threaded fastening, the pointed conductive elements 74 and 76 are caused to pierce the double conductor and establish connections to the conductors 52 and 54 to complete the installation. In this manner, as much garden illumination may be provided as desired, with any desired light distribution within the garden.

The individual threaded fastenings preferably consist of a tubular member 78 having a flat outer head portion 80 and having a square outer shank portion. The hole in the main body plate for the threaded fastening preferably is a square hole of the exact size to accommodate the square shank of the tubular member 78 so that there will be no relative rotation between them after they are assembled. The tubular member 78 is provided with interior threads to accept a decorative thumb screw 81 which preferably has a large plastic head molded thereto. The head 82 is preferably provided with a decorative design including structures such as radial ribs which also serve the utilitarian purpose of providing finger holds for tightening the thumb screw without the necessity for using tools.

A structure very similar to that illustrated in FIG. 10, including electrical connector elements such as 74 and 76, may be employed for establishing interconnections from the end of one of the double electrical conductors 50 to another of the electrical conductors 50 associated with an adjacent main body plate. In such end interconnections, a flexible conductor may be employed between adjacent connector assemblies to accommodate for minor misalignments between the ends of the adjacent main body plates. A similar connector assembly may be provided as the power input connection to an entire series of lawn edging structures in accordance with the present invention.

The individual conductors 52 and 54 are preferably stranded conductors. This promotes flexibility, and it also enhances the operation of the connections established by the pointed conductive elements 74 and 76. The double conductor structure 50, including conductors 52 and 54, is preferably designed and rated to withstand outdoor weathering and moisture conditions. For this purpose, a conductor having Underwriters Laboratories rating classification UF may be used.

When necessary, the lawn edging structure, including the main body plate 12 and the auxiliary plate 28, may be cut to any desired length in order to perfectly fit the edge of a garden bed. Whenever such a cut is made in the embodiment including the electrical features illustrated in FIGS. 9 and 10, the exposed ends of the conductors 52 and 54 are protected by a plastic cap which is slipped over the cut end of the double conductor structure 50, and held by frictional engagement. This cap is simple in construction and is not illustrated in the drawings. Low voltages such as 24 volts are preferably employed with the modification of the invention illustrated in FIGS. 9 and 10 in order to avoid safety hazards.

The main body plate and the auxiliary plate of the present invention may preferably be composed of aluminum sheet. However, sheet steel may also be employed, preferably in the form of stainless steel, or in the form of zinc plated or painted steel. It is preferred that a thick and sturdy sheet material be employed which may be as thick as 1/16 of an inch for greater rigidity and durability.

The finished product may be painted a dark to medium green color to blend in with the lawn. Alternatively, a highly reflective paint may be used as the finishing material in order to provide greater visibility, particularly in the dark, as a safety precaution.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:
1. A lawn edging structure including a main body plate adapted to be embedded in the ground in a substantially vertical position between the lawn edge and an area from which grass is to be excluded, wherein the improvement comprises
   an auxiliary plate attached to said main plate at grade level,
   said auxiliary plate being arranged to extend horizontally into the lawn area to block grass growth in a strip thereof adjacent to said main plate,
   an insulated double electrical conductor mounted upon said main body plate at the side thereof opposite to the side at which said auxiliary plate is attached,
   said insulated double conductor including individual conductive elements arranged in spaced parallel relationship with one vertically above the other,
   an electrical lamp fixture including a lamp socket mounted upon said main body plate,
   said lamp fixture including electrical connections to said double conductor.

2. A lawn edging structure as claimed in claim 1 wherein
   said lamp fixture comprises a U-shaped housing fitted around said double conductor, and wherein
   said electrical connections of said lamp fixture include pointed conductive elements arranged in alignment with said respective conductive elements of said double conductor,
   said pointed elements being positioned to penetrate through the outer insulation of said double conductor and into the respective conductive elements of said double conductor to establish electrical connections for said lamp fixture.

3. A lawn edging structure as claimed in claim 2 including
   a combined clamping and mounting means comprising a compression device compressing and holding said lamp fixture over said double conductor
   the compression of said device causing said pointed contact members of said lamp fixture to penetrate and maintain the penetration into said conductive elements of said double conductor.

4. A lawn edging structure as claimed in claim 3 wherein
   said clamping means comprises a screw threaded fastening, and wherein
   said main body plate and said double conductor and said lamp fixture each include at least one central opening to accommodate said screw threaded fastening.

References Cited
UNITED STATES PATENTS

| | | | |
|---|---|---|---|
| 1,139,515 | 5/1915 | Haas. | |
| 1,977,021 | 10/1934 | Spencer | 47—33 |
| 1,979,979 | 11/1934 | Martini | 47—33 |
| 2,184,904 | 12/1939 | Boehme | 47—33 |
| 2,920,184 | 1/1960 | Kessler | 240—2 |
| 3,253,137 | 5/1966 | Richter | 240—10 |
| 3,277,606 | 10/1966 | Cohen | 47—33 |

ROBERT E. BAGWILL, Primary Examiner

U.S. Cl. X.R.
94—31; 240—2